Patented Oct. 13, 1953

2,655,538

UNITED STATES PATENT OFFICE 2,655,538

BIS-HYDRAZONES

Heinrich Jensch, Frankfurt am Main Hochst, Germany, assignor to Farbwerke Hoechst Aktiengesellschaft vormals Meister Lucius und Brüning, Frankfurt am Main Hochst, Germany, a company of Germany No Drawing. Application July 16, 1951, Serial No. 237,061. In Germany July 24, 1950

5 Claims. (Cl. 260—564)

The present invention relates to new bis-hydrazones.

I have found that hitherto unknown bis-hydrazones of aliphatic, vicinal dioxo compounds can be prepared, which have in one hydrazone group a guanyl radical and in the other a phenyl radical containing one of the following substituents:

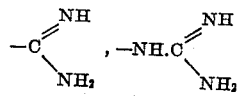

or

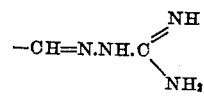

The products thus obtained have the following structural formula:

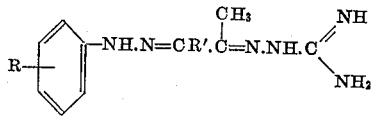

wherein R stands for a member of the group consisting of

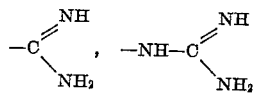

and

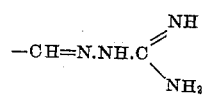

and R' stands for a member of the group consisting of hydrogen, methyl, ethyl and allyl.

According to one feature of the invention the specified compounds are obtained by condensing with amino-guanidine a monophenyl-hydrazone of an aliphatic, vicinal dioxo-compound of which the phenyl nucleus contains one of the specified substituents.

According to a further feature of the invention the compounds may be obtained by condensing a mono-guanyl-hydrazone of an aliphatic, vicinal di-oxo compound with a phenyl hydrazine which contains in the phenyl nucleus one of the three specified substituents.

According to a still further feature of the invention it is also possible to condense with amino-guanidine a mono-phenyl-hydrazone of an aliphatic, vicinal di-oxo compound containing in the nucleus a group which can be transformed into one of the specified substituents, and to transform this group into one of the said substituents.

The compounds thus obtained are distinguished by their efficacy in protozoan infections.

The following examples serve to illustrate the invention but they are not intended to limit it thereto:

Example 1

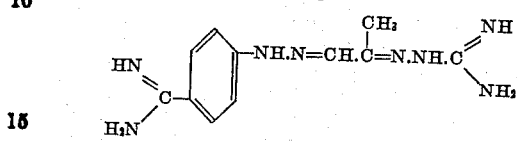

65 grams of pyroracemic aldehyde-para-guanyl-phenyl-hydrazone hydrochloride are mixed in 500 cc. of water with a solution of 35 grams of amino-guanidine nitrate in 180 cc. of water. After having been slightly acidified with dilute nitric acid, the mixture is heated, while stirring, in the water-bath until a clear solution is obtained. The solution is then mixed with an excess of dilute nitric acid and the yellow magma formed on cooling is filtered with suction and washed with dilute nitric acid. The dinitrate thus obtained, of the compound corresponding to the formula given above, is then transformed into the carbonate by mixing it, while stirring, with sodium carbonate solution. The carbonate is filtered with suction and washed with ice-cold water. After having been dried at ordinary temperature it constitutes an ochro-yellow powder which, on subsequently stirring with methanol and acidifying with methanolic hydrochloric acid, is transformed, with evolution of carbon dioxide, into the hydrochloride which, after cooling in ice, is filtered with suction and washed with ice-cold methanol. The product is readily soluble in water and more sparingly soluble in dilute hydrochloric acid and in methanol. When recrystallised from methanol and a small quantity of water, it does not melt up to 300° C. After having been recrystallised from water, the dinitrate melts at 276° C. with violent decomposition. The lactate, which is obtained from the carbonate in a manner analogous to that of obtaining the hydrochloride, melts at 253° C.–254° C., with decomposition.

The starting material, i. e. the pyroracemic aldehyde-para-guanyl-phenyl-hydrazone hydrochloride, is suitably prepared as follows: The hydrochloric acid solution of 63 grams of para-amino-benzamidine dihydrochloride (melting at 288° C. with decomposition, and obtained from the para-nitro-compound by reduction with hydrogen and a nickel catalyst), which solution has been diazotized with 21 grams of sodium nitrite, is mixed with an acetoacetic acid solution obtained by allowing a solution of 40 grams of acetoacetic ester to stand for 24 hours in 670 cc. of a caustic potash solution of 2.76 per cent. strength and then acidifying it with 310 cc. of 2 N-hydrochloric acid. 220 cc. of saturated sodium acetate solution are gradually added to the mixture, while stirring, during which operation a thick, brownish-yellow precipitate is formed with evolution of carbon dioxide; the precipitate is allowed to stand for several hours, filtered with suction and washed with N-hydrochloric acid and acetone. When the product has been recrystallised from glacial acetic acid it melts at 255° C. with decomposition. It is readily soluble in hot water, sparingly soluble in dilute hydrochloric acid in the cold and soluble in caustic soda solution, forming a dark brown-yellow solution.

*Example 2*

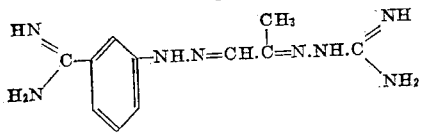

27 grams of pyroracemic aldehyde-meta-guanyl-phenyl-hydrazone nitrate are acidified with a small quantity of dilute nitric acid and then mixed in 200 cc. of water with a solution of 14 grams of amino-guanidine nitrate. The mixture is heated for 1 hour in a water-bath, while stirring; after cooling, an excess of dilute nitric acid is added and the di-nitrate corresponding to the above formula is filtered with suction and washed with N-nitric acid and acetone. It constitutes a brown-red powder which readily dissolves in hot water; it is moderately soluble in cold water, and after it has been recrystallised from water it melts at 262° C. with decomposition. The carbonate, obtained therefrom as described in Example 1, constitutes a grey-yellow powder which is dried under reduced pressure and then transformed, in the same manner as the para-compound, into the di-hydrochloride. A brownish-red crystalline powder is obtained which, after recrystallisation from methanol and acetone, melts at 273° C. with decomposition; it is readily soluble in water, methanol and dilute hydrochloric acid and sparingly soluble in ethanol.

The pyroracemic aldehyde-meta-guanyl-phenyl-hydrazone is prepared in a manner analogous to that of the para-compound, using meta-amino-benzamidine dihydrochloride (see "Berichte der Deutschen Chemischen Gesellschaft," vol. 28, page 486); it is precipitated as the nitrate by mixing the solution of its hydrochloride with dilute nitric acid. The nitrate constitutes a light red to brown powder which, recrystallised from water, melts at 209° C.–210° C. with decomposition.

*Example 3*

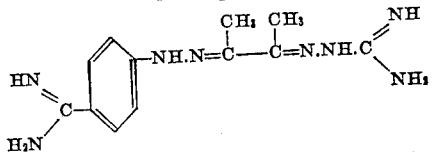

25.5 grams of diacetyl-mono-para-guanyl-phenyl-hydrazone hydrochloride in 150 cc. of water are mixed with a hot solution of 14 grams of aminoguanidine nitrate in 65 cc. of water, whereupon the mixture is heated in a water-bath, while stirring, until dissolution has taken place. On cooling, a practically colorless magma is formed which is stirred with an excess of sodium carbonate solution, during which operation it is transformed into the voluminous carbonate which is centrifuged and washed several times with water. After drying, the carbonate is mixed with methanol, while stirring; by acidifying the mixture with methanolic hydrochloric acid, it is transformed into the dihydrochloride which is filtered with suction and washed with acetone. It constitutes a yellowish powder which readily dissolves in water, forming a reddish-yellow solution. By means of dilute caustic soda solution the practically colorless crystalline base of the above constitution is precipitated from the solution. After recrystallisation from aqueous methanol, the base melts at 240° C. with decomposition.

The starting material can be obtained according to the method described in Example 1, in the form of the hydrochloride, by coupling diazotized para-amino-benzamidine with methyl-aceto-acetic acid. The hydrochloride constitutes a feebly reddish powder which is sparingly soluble in cold water and readily soluble in hot water. When recrystallised from water, it melts at 272° C. with decomposition; the base precipitated with dilute caustic soda solution melts at 199° C.–200° C. with decomposition.

*Example 4*

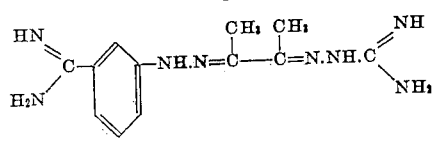

24.6 grams of diacetyl-mono-meta-guanyl-phenyl-hydrazone hydrochloride are heated in the water-bath together with 50 cc. of water and a solution of 15 grams of amino-guanidine carbonate in about 70 cc. of 2 N-hydrochloric acid until complete dissolution has taken place. After cooling, the solution is mixed with concentrated hydrochloric acid and the salt which has separated is filtered with suction in the ice-cold condition and washed with ice-cold dilute hydrochloric acid and acetone. The di-hydrochloride of the above base constitutes an almost colorless incompact powder which readily dissolves in water on heating, and forms a yellow solution. When recrystallised from methanol and acetone, it melts at 302° C. with decomposition.

The starting material is obtained as described in Example 3, using meta-amino-benzamidine. It constitutes practically colorless, fine, long small needles and melts at 268° C.–270° C. with decomposition.

*Example 5*

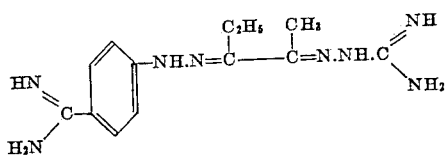

20.5 grams of pentane-2,3-dione-3-para-guanyl-phenyl-hydrazone hydrochloride are weakly acidified and then heated on the water-bath, while stirring, toegther with 100 cc. of water and a solution of 9.8 grams of amino-guanidine nitrate in 45 cc. of water, until a clear solution is formed. After cooling in ice, the fine crystalline precipitate is filtered with suction and stirred with an excess of sodium carbonate solution. The carbonate is formed during this operation in the form of a precipitate of the nature of a thick oil which, on cooling and rubbing, becomes crystalline. After drying, the carbonate in methanol is acidified with methanolic hydrochloric acid, during which operation a pale yellow magma of the dihydrochloride of the compound having the formula given above, is formed. The compound dissolves in water and forms a red-yellow solution; when recrystallised from a large quantity of methanol, it melts at 244° C. with decomposition.

The starting material is obtained as described in Example 3, using ethyl-acetoacetic acid. It constitutes a reddish crystalline powder which dissolves in hot water and forms a red-yellow solution. The base is precipitated by means of dilute caustic soda solution. When the base has been recrystallised from water and a small quantity of methanol, it constitutes a colorless, fine crystalline powder which, on drying on the water-bath, assumes a brown color. It melts at 113° C.–114° C. with decomposition.

*Example 6*

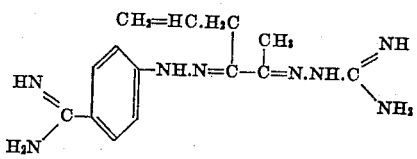

20 grams of hexene-(1)-dione-(4.5)-4-para-guanyl - phenyl - hydrazone hydrochloride in 130 cc. of water are weakly acidified with dilute hydrochloric acid and then heated on the water-bath for about ¼ hour with a solution of 9.3 grams of amino-guanidine nitrate in 45 cc. of water. After cooling, the carbonate is precipitated with potassium carbonate solution. After having been washed with water, it constitutes a light yellow powder which is covered by pouring methanol upon it and, on acidifying with methanolic hydrochloric acid, it is transformed, with evolution of carbon dioxide, into the yellow dihydrochloride of the base named above. When recrystallised from methanol and acetone, it melts at 230° C. with decomposition.

The starting material is obtained in a manner analogous to that described in Example 3 by using, instead of methyl, the allyl-acetoacetic acid which is formed in a manner analogous to the process described in Example 1, by shaking the ester for several days with caustic potash solution. A feebly reddish, fine crystalline powder is formed. The base may be precipitated from the aqueous solution by means of dilute caustic soda solution. After recrystallisation from water and a small quantity of methanol, the base is substantially colorless; on drying it assumes a brownish-yellow coloration; it melts unsharply at about 90° C. By means of sodium carbonate a carbonate is precipitated which crystallises from water in the form of small brown needles melting at 66–67° C.

*Example 7*

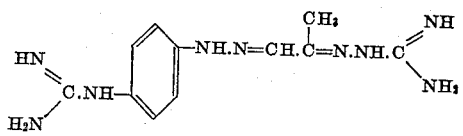

38 grams of pyroracemic aldehyde-para-guan-idinophenyl-hydrazone hydrochloride in 100 cc. of water are heated on the water-bath together with a solution of 25 grams of amino-guanidine carbonate in about 120 cc. of 2 N-hydrochloric acid. After the addition of hydrochloric acid in excess and cooling in ice, the dihydrochloride of the above compound is filtered with suction and washed with 2 N-hydrochloric acid and acetone. It is purified by dissolving it in water, filtering the solution and reprecipitating with hydrochloric acid in excess. A substantially colorless powder is obtained after recrystallisation from methanol and a small quantity of water with subsequent addition of acetone. The power melts at 275° C.–276° C. with decomposition.

The starting material is obtained by the process described in Example 1, using para-amino-phenyl-guanidine instead of para-amino-benzamidine. A weak reddish, crystalline powder is formed which, after recrystallisation from water, melts at 278° C. with decomposition. Para-amino-phenyl-guanidine may be obtained in the form of the carbonate (when recrystallised from water, melting at 180–181° C. with decomposition) by precipitating with saturated potash solution in excess either the catalytically reduced nitro-compound or the para-acetamino-phenyl-guanidine (obtained from para-amino-acetanilide and cyanamide, the carbonate when recrystallised from water melting at 220° C. with decomposition) saponified with dilute hydrochloric acid.

*Example 8*

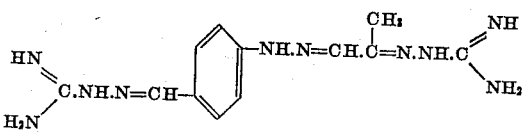

14 grams of pyroracemic aldehyde - para - (guanyl-hydrazone-formyl) - phenyl - hydrazone hydrochloride are heated on the water-bath together with 70 cc. of water and a solution of 7.5 grams of aminoguanidine carbonate in about 35 cc. of 2 N-hydrochloric acid until dissolution is complete, whereupon the solution is mixed with hydrochloric acid in excess and the dihydrochloride of the compound of the formula given above is well cooled, filtered with suction and washed with ice-cold dilute hydrochloric acid and acetone. It constitutes a red-brown powder which readily dissolves in water and forms a red solution. The powder is recrystallised from methanol and acetone; it then constitutes a brown crystalline powder melting at 266° C. with decomposition. The nitrate when recrystallised from water melts at 250° C.–251° C. with decomposition.

The starting material may be prepared in the manner described in Example 1 from para-amino-benzalguanyl-hydrazone and acetoacetic acid, and when recrystallised from water it constitutes a brown-red powder melting at 120° C. with decomposition. The para-amino-benzalguanyl-hydrazone may be obtained as carbonate in the form of a yellow powder by precipitating with potassium carbonate solution para-acetamino-benzalguanyl hydrazone (when recrystallised from water, melting at 238° C. with decomposition) which has been saponified with dilute hydrochloric acid. The powder thus obtained melts at 235° C. with decomposition.

Example 9

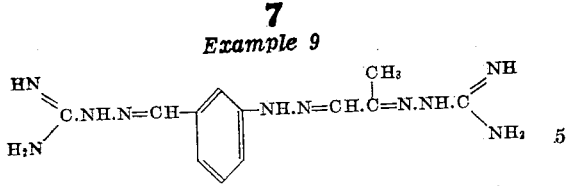

18 grams of pyroracemic aldehyde - meta - (guanyl-hydrazone-formyl) - phenyl - hydrazone hydrochloride are heated on the water-bath, while stirring, together with 80 cc. of water and a feebly acid solution of 10 grams of amino-guanidine carbonate in about 50 cc. of 2 N-hydrochloric acid. A dark-red solution is obtained within about ½ hour. On addition of hydrochloric acid in excess, a light-brown magma of the dihydrochloride of the above base is formed which is cooled in ice, filtered with suction and washed with dilute hydrochloric acid and acetone. A reddish-grey powder is obtained which on dissolving in water forms a red solution. It may be recrystallised from alcohol and acetone and melts at 149° C.–150° C. with slow decomposition accompanied by swelling.

The starting material may be prepared as described in Example 8, using meta-aminobenzal-guanyl-hydrazone (obtained from the nitro-compound by catalytic reduction; the dihydrochloride melts at 275° C. with decomposition). When recrystallised from water, it constitutes a feebly brownish powder which assumes a black-violet coloration by the addition of concentrated hydrochloric acid. The powder melts at 222° C. with decomposition.

Example 10

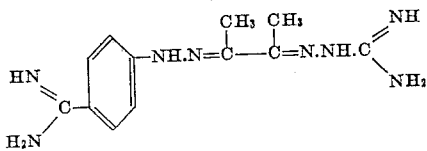

A diazonium hydrochloride solution of para-amino-benzamidine is reduced at a temperature between —10° C. and —5° C. with a strong stannous chloride solution in hydrochloric acid, the reduction product is neutralised with caustic soda solution, the solution is detinned and evaporated to dryness under reduced pressure, the residue is extracted with alcohol and the alcoholic extract is mixed with ether. The dihydrochloride of the para-hydrazine-benzamidine is thus obtained which is recrystallised from alcohol and then melts at 211° C.–212° C. with decomposition. A solution of 3 grams of this salt is mixed with a hot aqueous solution of 1.75 grams of diacetyl-monoguanyl-hydrazone and the mixture is acidified with dilute hydrochloric acid. After some time dilute hydrochloric acid is added in excess, after cooling in ice the precipitate is filtered with suction and washed with ice-cold dilute hydrochloric acid and acetone. The pale yellow powder is soluble in water and forma a yellow solution. The nearly colorless base, the diacetyl - (guanyl) - (para - guanyl - phenyl) -bis-hydrazone, is precipitated from the solution by means of dilute caustic soda solution. The base melts at 240–241° C. with decomposition. The mixture with the base of Example 3 has the same melting point.

The diacetyl - monoguanyl - hydrazone (when recrystallised from water, melting at 214° C. with violent decomposition) may be obtained by careful reaction of diacetyl with the hydrochloride of amino-guanidine.

Example 11

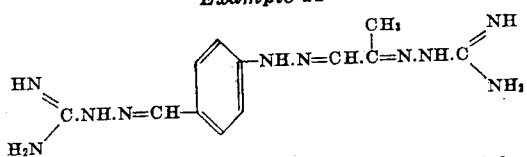

Pyroracemic aldehyde-para-formyl-phenyl-hydrazone may be obtained by coupling diazotized para-amino-benzaldehyde with acetoacetic acid. When recrystallised from benzene, the compound constitutes a feebly reddish powder melting at 152° C. 3 grams of the hydrazone thus obtained are dissolved in methanol, the solution is mixed with a hot aqueous solution of 4.5 grams of amino-guanidine nitrate and, after the addition of a small quantity of dilute nitric acid, the mixture is heated for a prolonged time on the water-bath. After the addition of dilute nitric acid in excess, the dinitrate of the guanyl-hydrazono-pyroracemic aldehyde-(para-guanyl-hydrazono-formyl)-phenyl-hydrazone is filtered with suction and washed with water. When recrystallised from water, the product melts at 250° C.–251° C. with decomposition. The mixture with the dinitrate of Example 8 has the same melting point.

I claim:

1. The compound of the formula:

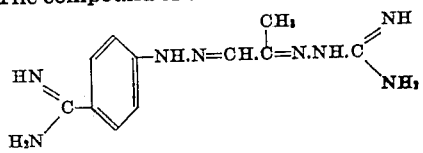

2. The compound of the formula:

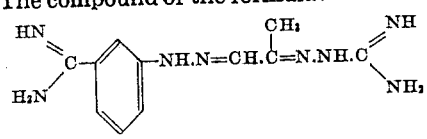

3. The compound of the formula:

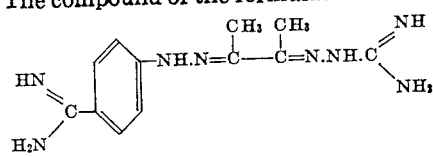

4. The compound of the formula:

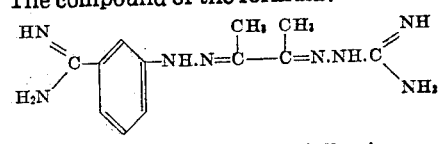

5. The compounds of the following general formula:

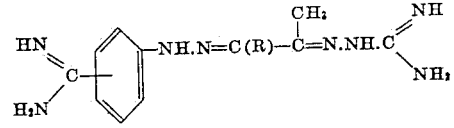

wherein R represents a member selected from the group which consists of hydrogen and aliphatic hydrocarbon radicals containing from 1 to 3 carbon atoms.

HEINRICH JENSCH.

No references cited.